United States Patent
Ebert et al.

(10) Patent No.: US 6,907,174 B2
(45) Date of Patent: Jun. 14, 2005

(54) OPTICAL FIBER

(75) Inventors: Wolfgang Ebert, Krefeld (DE);
Hans-Josef Behrens, Dormagen (DE);
Heinz-Dieter Brandt, deceased, late of Willich (DE); by Inken Margarethe Brandt, legal representative, Willich (DE); Thomas Föllinger, Dormagen (DE); Wilfried Haese, Odenthal (DE); by Martina Brandt, legal representative, Willich (DE); by Franziska Hanne Brandt, legal representative, Willich (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/381,646

(22) PCT Filed: Sep. 19, 2001

(86) PCT No.: PCT/EP01/10798

§ 371 (c)(1),
(2), (4) Date: Aug. 25, 2003

(87) PCT Pub. No.: WO02/29458

PCT Pub. Date: Apr. 11, 2002

(65) Prior Publication Data

US 2004/0057694 A1 Mar. 25, 2004

(30) Foreign Application Priority Data

Oct. 2, 2000 (DE) .......................... 100 48 795

(51) Int. Cl.$^7$ .............. G02B 6/02; G02B 6/22
(52) U.S. Cl. .............. 385/128; 385/123; 385/145; 65/376
(58) Field of Search .............. 385/123, 128, 385/145; 65/376, 385

(56) References Cited

U.S. PATENT DOCUMENTS

| | | | |
|---|---|---|---|
| 4,522,465 A | 6/1985 | Bishop et al. | 350/96.3 |
| 4,694,052 A | 9/1987 | Hirose et al. | 525/454 |
| 4,741,596 A | 5/1988 | Broer et al. | 350/96.34 |
| 4,741,597 A | 5/1988 | Broer | 350/96.34 |
| 4,798,445 A | 1/1989 | Yamamoto et al. | 350/96.34 |
| 4,836,642 A * | 6/1989 | Matsumoto et al. | 385/145 |
| 4,919,514 A * | 4/1990 | Ebert et al. | 385/141 |
| 4,986,630 A * | 1/1991 | Herbrechtsmeier et al. | 385/123 |
| 5,199,098 A | 3/1993 | Nolan et al. | 385/128 |
| 5,596,669 A | 1/1997 | Murphy et al. | 385/128 |
| 5,912,381 A | 6/1999 | Narayan et al. | 560/81 |
| 6,470,630 B1 * | 10/2002 | Miyamoto | 52/64 |

FOREIGN PATENT DOCUMENTS

| | | | |
|---|---|---|---|
| EP | 0 125 710 | 11/1984 | C08F/299/06 |
| EP | 0 327 807 | 8/1989 | G02B/6/16 |
| JP | 59-216104 | 12/1984 | G02B/5/14 |
| JP | 59-216105 | 12/1984 | G02B/1/04 |
| JP | 59-218404 | 12/1984 | G02B/1/04 |
| JP | 61-231510 | 10/1986 | C08F/20/22 |
| JP | 61-240206 | 10/1986 | G02B/6/10 |
| JP | 61-245110 | 10/1986 | C08G/63/62 |
| JP | 61-278807 | 12/1986 | G02B/6/44 |

OTHER PUBLICATIONS

Database WPI Section Ch, Week 199442 Derwent Publications Ltd., London, GB; Class A18, AN 1994–338311 XP002189069 & JP 06 263809 A (DSM NV) Sep. 20, 1994 Zusammenfassung.

* cited by examiner

Primary Examiner—Akm Enayet Ullah
Assistant Examiner—Daniel Petkovsek
(74) Attorney, Agent, or Firm—Joseph C. Gil; Aron Preis

(57) ABSTRACT

An optical fiber that contains a core of polycarbonate and a coating is disclosed. The coating is a polymer that contains structural units conforming to specified formulae. Also disclosed is a method for preparing the inventive fibers and the use thereof for transmitting signals.

11 Claims, No Drawings

OPTICAL FIBER

This application is a 371 of PCT/EP01/10798, filed Sep. 19, 2001.

The present invention provides light guides (optical fibers) including a core containing polycarbonate and a coating of specific polyacrylates or polymethacrylates and stabilisers, and also a process for producing said light guides, the use of said light guides to transfer optical signals in means of transport and means of transport containing light guides.

Light guides are used to transfer optical signals. Light guides contain a core made of optically transparent material. The core may consist, for example, of glass or a plastics material. The core is also called a fibre. The core or the fibre may have any cross-section and diameter at all. In practice, the cross-section and diameter are chosen in accordance with the current technical requirements.

The core of the light guides is usually coated. The coating may consist, for example, of a plastics material or a lacquer. The coating offers a certain degree of protection against mechanical effects on the core. Furthermore, the coating improves the efficiency of transfer of optical signals by the light guide. Thus, the mechanical and optical properties of the coating in particular are important.

This system of core and coating may be surrounded by a sleeve or a casing. This is used, for example, to protect against damage and effects of the environment.

Transfer of the optical signal, preferably by visible light, takes place in light guides primarily in the core. Thus the optical properties of the core in particular are important.

Light guides based on plastics coated polycarbonate fibres are known from:
(a) EP-A 0 203 327;
(b) JP-A 84/216 104;
(c) JP-A 84/216 105;
(d) JP-A 84/218 404;
(e) JP-A 86/231 510;
(f) JP-A 86/240 206;
(g) JP-A 86/245 110;
(h) JP-A 86/278 807.

In these publications, light guides based on polycarbonate fibres are described in which the polycarbonate cores are coated with specific fluorine-containing polymers ((a), (e), (f), (h)), with specific mixed polymers of methyl methacrylates, styrene or vinyltoluene and maleic anhydride (b), with specific mixed polymers of methyl methacrylates, α-methylstyrene and maleic anhydride (c), with specific mixed polymers of methyl methacrylate, α-methylstyrene, styrene and maleic anhydride (d) and with silicone resins, silicone/acrylate resins, urethane/acrylate resins, polyamides or poly-4-methylpentene-1 (g).

These plastics, which have hitherto been proposed for coating polycarbonate fibres, are disadvantageous because they have inadequate heat resistance (b), (c), (d), too low an elongation at break (b), (c), (d), (g) and/or inadequate adhesion to the polycarbonate (a), (e), (f), (g), (h), are too costly to be produced for application on an industrial scale and thus too expensive ((a), (e), (f), (h)), and/or lead to the formation of stress cracks in the polycarbonate core (g).

It is known that mixtures of polyfunctional and monofunctional acrylates or methacrylates which are polymerisable by UV irradiation can be used for coating glass fibres to be used as light guides (see e.g. EP-A 0 125 710, EP-A 0 145 929, EP-A 0 167 199, DE-A 3 522 980).

These mixtures, developed for coating glass fibres, are unsuitable for polycarbonate fibres because they lead to the formation of stress cracks in the polycarbonate core and in addition have too high a refractive index.

EP-A 0 327 807 discloses light guides with a core of polycarbonate and a coating of polymerised acrylates and/or methacrylates.

Known light guides with a polycarbonate core have the disadvantage that the coating, after thermooxidative damage, has too low a mechanical strength, in particular too small an elongation at break.

The object of the invention is therefore to provide light guides which do not have this disadvantage.

Furthermore, the object of the invention comprises providing a process for producing these light guides as well as providing means of transport containing the light guide according to the invention.

The advantageous properties of polycarbonate fibres, in particular high transparency, high refractive index, high heat resistance, good mechanical properties such as e.g. high bending strength and high breaking strength and also low capacity for the absorption of water, should not be impaired.

It has now been found that the object according to the invention can be achieved when specific stabilisers are added to the coating on the light guide.

The invention provides light guides including a core of polycarbonate and a coating containing a polymer which contains repeating units derived from the monomers
A) one or more different compounds of the formula (I)

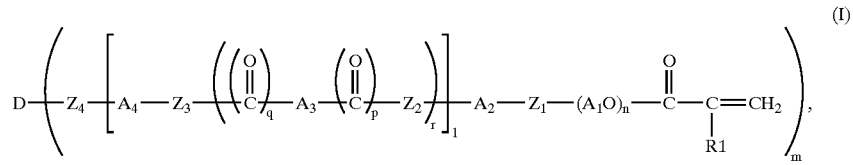

in which
m represents 2, 3 or 4,
D represents the m-valent group from an aliphatic or aromatic hydrocarbon,
$R_1$ is hydrogen or methyl,
$Z_1$, $Z_2$ and $Z_3$, independently, represent oxygen, sulfur, the —N(R) group (in which R is hydrogen or unsubstituted or substituted, preferably unsubstituted, alkyl, aralkyl or aryl) or a divalent group of the formula (II)

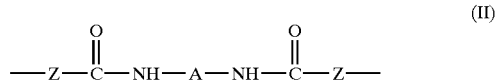

in which
Z represents oxygen, sulfur or the —N(R) group, and
A represents an unsubstituted or substituted, preferably unsubstituted, divalent group from an aliphatic, cycloaliphatic, araliphatic or aromatic hydrocarbon, $Z_4$ represents oxygen, the divalent group of the formula (II) or one of the following divalent groups

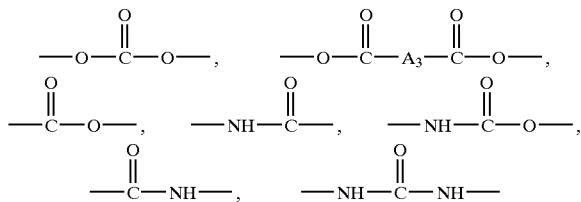

$A_1$, $A_2$, $A_3$ and $A_4$, independently, represent an unsubstituted or substituted, preferably unsubstituted, divalent group from an aliphatic, cycloaliphatic, aromatic-aliphatic or aromatic hydrocarbon, n is zero or an integer from 1 to 20, p, q and r, independently, may take on the value zero or 1 and l has a numerical value such that the weight average of the molecular weight of the compound of the formula (I) is 450 to 5000, and B) one or more different compounds of the formula (III)

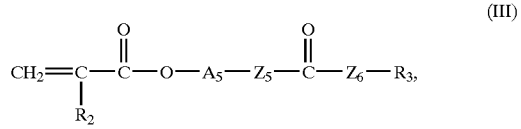

in which $R_2$ is hydrogen or methyl, $A_5$ represents an unsubstituted or substituted, preferably unsubstituted, divalent group from an aliphatic or cycloaliphatic hydrocarbon, $Z_5$ and $Z_6$, independently, represent oxygen, sulfur or the —N(R') groups, in which R' is hydrogen or unsubstituted or substituted, preferably unsubstituted alkyl, aralkyl or aryl, and $R_3$ represents an unsubstituted or substituted, preferably unsubstituted, alkyl, cycloalkyl or aralkyl group, wherein the coating contains one or more different stabilisers chosen from the group consisting of organic phosphites and organic sulfides.

The said light guides are preferably those in which $A_1$, $A_2$, $A_3$, $A_4$ and A, independently, represent an unsubstituted or substituted, preferably unsubstituted, divalent aliphatic or cycloaliphatic hydrocarbon group.

Furthermore, the said light guides are preferably those in which p and q have the value 1, $Z_2$ and $Z_3$ represent oxygen, $Z_1$ represents oxygen or the group

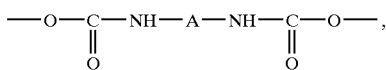

in which A is an unsubstituted or substituted, preferably unsubstituted, divalent group from an aliphatic or cycloaliphatic $C_2$–$C_{18}$ hydrocarbon, preferably the group

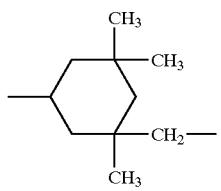

$Z_4$ represents oxygen or the group

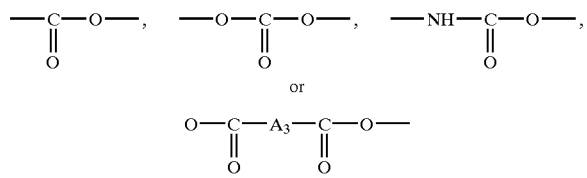

in which $A_3$ is an unsubstituted or substituted, preferably unsubstituted, $C_2$–$C_{18}$ group from an aliphatic or cycloaliphatic hydrocarbon, $A_1$ is an ethylene or propylene-1,2 group and $A_2$, $A_3$ and $A_4$, independently, are unsubstituted or substituted, preferably unsubstituted, divalent groups, preferably $C_2$–$C_8$ groups, from aliphatic or cycloaliphatic hydrocarbons.

The said light guides are preferably those in which, in formula (III)

$A_5$ is an unsubstituted or substituted, preferably unsubstituted, $C_2$–$C_6$ alkylene group, $Z_5$ and $Z_6$, independently, represent oxygen or the —NH group and $R_3$ is a $C_1$–$C_{18}$ alkyl group.

The said light guides are preferably those in which, in formula (III)

$R_3$ represents an unsubstituted or substituted, preferably unsubstituted, $C_1$–$C_5$ alkyl group, $A_5$ represents an ethylene group and $Z_5$ represents oxygen and $Z_6$ represents the —NH group.

The stabilisers are compounds which offer protection against thermooxidative ageing of the coating or act as radical traps.

The stabilisers are chosen from the group consisting of organic phosphites and organic sulfides.

It is preferred that the concentration of stabilisers in the coating is 0.01 to 0.5 wt. %.

It is preferred that, in the said coated light guides, the proportion of repeating units derived from the monomers mentioned under A) in the polymer is 25 to 75 wt. % and the proportion of repeating units derived from the monomers mentioned under B) in the polymer is 25 to 75 wt. % and wherein the sum of the proportions of repeating units derived from the monomers mentioned under A) and under B) in the polymer is 50 to 100 wt. %, particularly preferably 100 wt. %.

Furthermore, the invention provides a process for producing light guides according to the invention by coating the core of the light guide with a composition containing the monomers A) and B) and the stabilisers and one or more different photoinitiators, wherein the composition is polymerised on the core by UV irradiation.

A process in which the proportion of photoinitiators in the composition is 0.1 to 10 wt. % is preferred.

Furthermore, the invention provides light guides obtainable by the process according to the invention.

Furthermore, the invention provides use of light guides according to the invention in means of transport.

Furthermore, the invention provides means of transport containing light guides according to the invention.

According to the invention, the coating contains one or more different stabilisers, preferably at a concentration of 0.01 wt. % to 0.5 wt. %, particularly preferably 0.05 wt. % to 0.3 wt. %.

According to the invention, compounds suitable for use as stabilisers are chosen from the group consisting of organic phosphites and organic sulfides. Organic sulfides with sterically hindered phenolic groups are very particularly preferred.

Furthermore, stabilisers which contain 3-[3',5'-bis-(1",1"-dimethylethyl)-4'-hydroxyphenyl]propionic acid or structures derived therefrom as a structural element are preferred.

The solutions to the object according to the invention, which are the subject matter of the present invention, have numerous advantages. The advantageous properties of polycarbonate fibres, as mentioned above, are not impaired. They are in fact amplified by the coating according to the invention in light guides according to the invention. The optical, mechanical and thermal properties of light guides according to the invention, are very good. They are insensitive to thermooxidative effects.

The rate of hardening of coatings according to the invention is very high, which enables an advantageous production process.

Coatings according to the invention ensure that there is no stress crack formation in the polycarbonate fibre.

The use of light guides according to the invention in means of transport is advantageous because light guides according to the invention enable a weight reduction as compared with known light guides, for example those made of glass. In addition, they have advantageous mechanical properties, in particular light guides according to the invention are unbreakable when compared with light guides made of glass. In addition, light guides according to the invention are much simpler to handle and enable better connection techniques.

Copper cables are conventionally used for signal transfers in cars, in comparison with which a considerable weight reduction is possible.

Means of transport in the context of the present invention are in particular cars, track vehicles, ships and aircraft.

Stabilisers according to the invention are known or can be prepared by known processes. Some of them are commercially available. They can be obtained, for example, from Ciba Spezialitäten GmbH, Lampertheim, Germany.

The monomers for coatings according to the invention are known or can be prepared by known processes. Some are commercially available.

Examples of D, as a tetravalent group from aliphatic or aromatic hydrocarbons, which may be mentioned are for example the parent hydrocarbon groups from tetravalent aliphatic alcohols such as e.g. pentaerythritol.

Examples of D, as a trivalent group from aliphatic or aromatic hydrocarbons, which may be mentioned are for example the parent hydrocarbon groups from aliphatic triols such as glycerine, trimethylolethane, trimethylolpropane or hexanetriol, aromatic tricarboxylic acids such as benzene-1,2,4 tricarboxylic acid or benzene-1,3,5 tricarboxylic acid or aromatic triisocyanates such as 2,4,6-toluylene triisocyanate or 4,4',4"-triphenylmethane triisocyanate.

Examples of D, $A_1$, $A_2$, $A_3$, $A_4$ and $A_5$ as optionally substituted divalent groups from aliphatic, cycloaliphatic, araliphatic or aromatic hydrocarbons which may be mentioned are the parent hydrocarbon groups from in particular aliphatic diols such as ethylene glycol, 1,2-propanediol, 1,3-propanediol, 2,2-dimethyl-1,3-propanediol, 1,2-butanediol, 1,3-butanediol, 2,3-butanediol, 1,4-butanediol, 1,5-pentanediol, 1,6- and 2,5-hexanediol, diethylene glycol, triethylene glycol, dipropylene glycol, 2,2,4-trimethylpentanediol-1,3, 2-methylpentanediol-2,4 and 2-ethylhexanediol-1,3 or cycloaliphatic diols such as 2,2-dimethyl-4,4-dimethyl-cyclobutanediol, 1,2-cyclopentanediol, 1,3-cyclopentanediol, 1,2-, 1,3- and 1,4-cyclohexanediol, 1,4-bishydroxymethylcyclohexane, 2,2-bis-(4-hydroxycyclohexyl)-propane, 1-methyl-2,2-bis-(4-hydroxycyclohexyl)-ethane, 2-methyl-2,4-bis-(4-hydroxycyclohexyl)-pentane and bishydroxymethyl-hexahydro-4,7-methanoindane.

For $A_3$, in addition, the parent hydrocarbon groups from aliphatic dicarboxylic acids such as succinic acid, dimethylmalonic acid, glutaric acid, methylsuccinic acid, adipic acid, dimethylsuccinic acid, pimellic acid, suberic acid, azelaic acid, sebacic acid, decanedicarboxylic acid or dimeric fatty acids or cycloaliphatic dicarboxylic acids such as 1,2-, 1,3-, 1,4-cyclohexanedicarboxylic acid, and aromatic carboxylic acids such as terephthalic acid, isophthalic acid, phthalic acid, naphthalene-1,2, -1,4, -1,5, -1,8 dicarboxylic acids, 5-methylisophthalic acid, tetrahydrophthalic acid and hexahydroendomethylene-tetrahydrophthalic acid, may be mentioned.

Examples of A, as optionally substituted divalent groups from aliphatic, cycloaliphatic, araliphatic or aromatic hydrocarbons which may be mentioned are the parent hydrocarbon groups from in particular aliphatic diisocyanates such as hexamethylene diisocyanate or trimethylhexamethylene diisocyanate-1,6, cycloaliphatic diisocyanates such as cyclohexane-1,4 diisocyanate, cyclopentane-1,3 diisocyanate, methylene-bis-(4,4'-cyclohexyl) diisocyanate and 1-isocyanatomethyl-5-isocyanato-1,3,3-trimethylcyclohexane and aromatic diisocyanates such as 2,4- and 2,6-toluylene diisocyanate, 3,3'-dimethyl-4,4'-diphenylmethanediisocyanate, 4,4'-diphenylmethane diisocyanate and 4,4'-diphenylether diisocyanate.

Examples of $R_3$, as optionally substituted alkyl groups which may be mentioned are $C_1$–$C_{18}$ alkyl groups such as methyl, ethyl, propyl, n-butyl, sec.-butyl, i-propyl, tert.-butyl, i-butyl, pentyl, i-pentyl, neopentyl, heptyl, n-hexyl, 2-ethyl-hexyl, nonyl, decyl, cetyl, dodecyl and stearyl groups and, as cycloaliphatic groups, cyclopentyl and cyclohexyl groups, optionally substituted by methyl groups. Suitable araliphatic groups are primarily the benzyl group and benzyl groups optionally substituted by methyl and lower alkoxy groups.

Compounds of the formula (I) (polyfunctional acrylic acid derivatives or methacrylic acid derivatives) are compounds which contain ether, ester, urethane and/or urea groups. Polyethers and/or polyester polyols are preferably reacted with acrylic acid derivatives or methacrylic acid derivatives.

Compounds of the formula (III) (monofunctional acrylates or methacrylates) are esters of acrylic acid or methacrylic acid which also contain an ester, urethane and/or urea group.

Polycarbonates according to the invention may contain conventional additives.

Light guides according to the invention may contain further constituents. By way of example, they may contain adhesion-promoting intermediate layers. For example, they may contain protective sheathing layers, in particular those which are flexible but resistant to aqueous solutions and to mineral oils and fuels, such as e.g. thermoplastic polyurethanes and rubbers.

Coatings according to the invention may contain conventional additives.

Coatings according to the invention may contain, in addition to components A and B, conventional additives such as e.g. solvents which are inert towards polycarbonates, polymerisation inhibitors, antioxidants, etc.

Photoinitiators are well-known and commercially available. The following may be mentioned as photoinitiators, for example: benzoin, benzoin ether, benzyl, benzyl ketals, benzophenone, thioxanthone and their derivatives e.g. benzylmethyl ketal and 2-hydroxy-2-methyl-1-phenyl-propane-1-one.

Polycarbonates and the common methods for preparing them are described e.g. in "Chemistry and Physics of Polycarbonates" Polymer Rev. vol. 9, Interscience Publishers. They may optionally be prepared with the addition of known chain-terminators (see e.g. EP-A 0 010 602, DE-A 3 143 252), branching agents such as triphenols and/or isatincresol (phenol) (see e.g. DE-A 1 570 533, DE-A 1 595 762, DE-A 2 500 092), stabilisers such as phosphanes and/or phosphites (see e.g. EP-A 0 143 906, DE-A 21 40 207) and mould release agents (see e.g. DE-A 2 507 748, DE-A 2 729 485 and DE-A 2 064 095). Processing the polycarbonates is preferably performed in a known manner by precipitating, spray-evaporating or extruding. The relative viscosity of a 0.5% strength solution of the polycarbonate in methylene chloride at 25° C. is preferably between 1.18 and 1.32.

Particularly preferred polycarbonates are the homopolycarbonate based on bisphenol A, the homopolycarbonate based on 1,1-bis-(4-hydroxyphenyl)-3,3,5-trimethylcyclohexane, the homopolycarbonate based on one of the following bisphenols

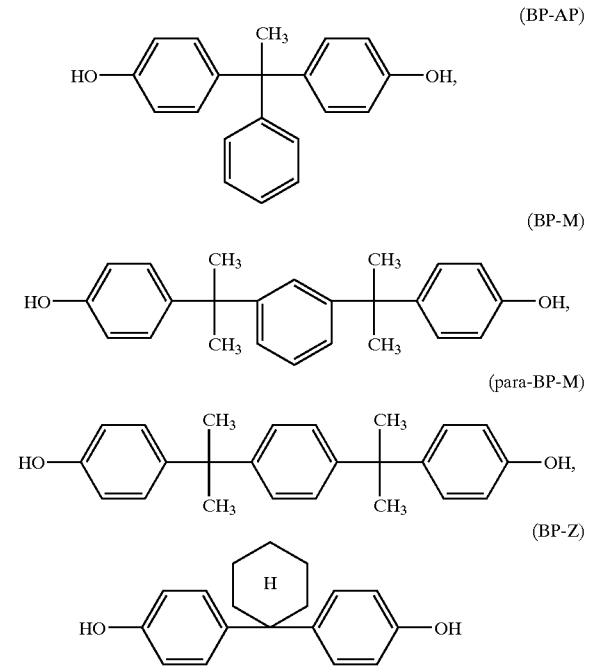

and the copolycarbonates made from combinations of the bisphenols mentioned, in particular the copolycarbonate based on the two monomers bisphenol A and 1,1-bis-(4-hydroxyphenyl)-3,3,5-trimethylcyclohexane.

The homopolycarbonate based on bisphenol A is very particularly preferred.

The polycarbonate preferably has a heavy metal content of less than 5 ppm, in particular less than 3 ppm, very particularly less then 0.5 ppm. Small concentrations of heavy metals cause a small degree of optical damping in the light guide.

The polycarbonate may be prepared by known processes, e.g. by the phase interface process from bisphenol and phosgene or by the melt transesterification process from carbonate and bisphenol.

The viscosity of the compositions polymerisable by UV irradiation which is applied according to the invention to the polycarbonate fibres may be varied over wide limits by choosing the molecular weight of components A and B and/or by the ratio of components A and B and may be adjusted to the intended rates of spinning out and the spinning temperature of the polycarbonate fibres. The compositions to be used according to the invention preferably have a viscosity of 500 to 10 000 cP at 25° C.

Compositions to be used according to the invention may preferably be processed at temperatures of 15 to 140° C.

In accordance with the process used, the polycarbonate core for the light guide of polycarbonate fibres may be produced first and this can be provided later with the coating materials to be applied according to the invention. However, it is more advantageous to apply the coating immediately after producing the polycarbonate fibres. The thickness of the coating to be applied according to the invention to the polycarbonate fibre is preferably less than 50 μm.

The light guides according to the invention may be processed to give single-strand or multiple-strand cables by encasing the light guides per se individually or by encasing several light guides made into a bundle with further polymer layers, e.g. by coextrusion. The polymer layer is then preferably a thermoplastic elastomer.

The light guides may be glued together by the coating to form a bundle or ribbons.

The diameter of the light guides is preferably between 0.05 mm and 5 mm, particularly preferably 0.1 mm to 3 mm, very particularly preferably 0.25 to 1.5 mm.

The light guides according to the invention may also be used as illuminating elements. For this purpose, the surface of the light guides is damaged at the required points. This couples up the light. Alternatively, the light may be passed to the place which is required to be illuminated. For example, fittings, for example in electronic equipment such as radios or computers, may be illuminated in this way.

EXAMPLES

Preparing the Coating:

Component A:

56.62 kg of hydroxyethyl acrylate, 0.0483 kg of di-tert.-butyl-hydroquinone and 0.0483 kg of Desmorapid SO (tin (II) ethylhexoate from Bayer AG, Leverkusen, Germany) were initially introduced into a tank and heated to 40° C. with stirring. 200 l/h of air were passed through the mixture during the heating procedure and the subsequent reaction. When the temperature reached 40° C., 48.28 kg of n-butyl isocyanate were added dropwise over 8 hours. Care was taken to ensure that the reaction temperature did not exceed 45° C. Then the mixture was stirred for 2 hours at 45° C. and then it was heated to 60° C. and stirred at this temperature for 4 hours. A sample gave an NCO content of less than 0.1 wt. %.

Component B:

37.36 kg of poly-THF were initially introduced along with 0.2 kg of di-tert.-butyl-hydroquinone and 0.1 kg of Desmorapid SO and 32.56 kg of hydroxyethyl acrylate and heated to 40° C. with stirring. 200 l/h of air were passed through the mixture during the heating procedure and the subsequent reaction. When the temperature reached 40° C., 32.56 kg of isophorone diisocyanate were added dropwise over 8 hours. Care was taken to ensure that the reaction temperature did not exceed 45° C. Then the mixture was stirred for 2 hours at 45° C. and then it was heated to 60° C. and stirred at this temperature for 4 hours. A sample gave an NCO content of less than 0.1 wt. %.

Formulating the Coating:

99.5 kg of component B were introduced initially, together with 597 g of Darocur 1173 and 199 g of the stabiliser cited below, and the mixture was heated to 50° C. (in the case of the comparison test, no stabiliser was used). 99.5 kg of component A were added rapidly. After mixing, the coating was filtered at 50 to 60° C. and 3 bar through a filter into a polyethylene lined drum.

Darocur 1173 is a commercial product from Merck, Darmstadt, Germany. It is

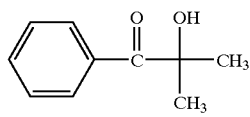

Polycarbonate light guides with a diameter of about 1 mm were coated with a 15 μm thick coating and the elongation at break was determined immediately after coating and after storing the light guide at 120° C. in a circulating air cabinet for 50 hours and for 100 hours.

Performing the Coating Procedure:

A polycarbonate fibre was drawn vertically and centrally downwards through a vessel which had a die in its base. The vessel was filled each time with one of the coating mixtures described below. Simultaneous coating of the fibre with the mixture concerned took place through the annular gap left between the thread and the die.

Below the coating vessel was arranged, parallel to the thread, a 20 cm long mercury medium-pressure lamp (power: 120 W/cm), the radiation from which was focussed on the thread by means of a parabolic mirror in order to obtain the highest possible light yield for UV polymerisation of the coating mixture.

After passing over a guide roller, the coated thread was wound onto a large drum which ensured, via a motor-driven unit, that the thread was pulled through the unit, wherein the speed was a constant 5 m/min.

The thickness of the coating applied to the polycarbonate threads was in all cases 10 to 30 μm.

Comparison Trial Without Using a Stabiliser:

Elongation at break of the coating after

| hardening: | 57% |
|---|---|
| after 50 h/120° C.: | 52% |
| after 75 h/120° C.: | 43% |
| after 100 h/120° C.: | 2% |

The large drop in elongation at break due to storage at elevated temperatures in air can be seen clearly.

EXAMPLES ACCORDING TO THE INVENTION

A) The stabiliser used was

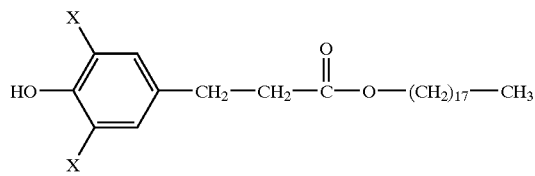

which can be obtained commercially as Irganox 1076 and is sold by Ciba.

Elongation at break of the coating after

| hardening: | 57% |
|---|---|
| after 50 h/120° C.: | 56% |
| after 75 h/120° C.: | 56% |
| after 100 h/120° C.: | 55% |

B) The stabiliser used was

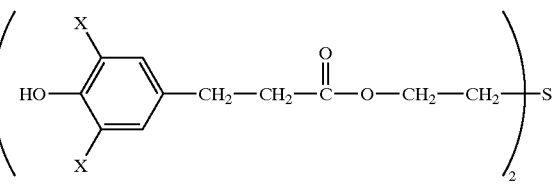

which can be obtained commercially as Irganox 1035 and is sold by Ciba.

Elongation at break of the coating after

| hardening: | 57% |
|---|---|
| after 50 h/120° C.: | 58% |
| after 75 h/120° C.: | 58.5% |
| after 100 h/120° C.: | 60% |

It can be seen that in this case the elongation at break actually increased slightly.

What is claimed is:

1. A light guide including a core of polycarbonate and a coating containing a polymer which contains repeating units derived from the monomers A) one or more different compounds of the formula (I)

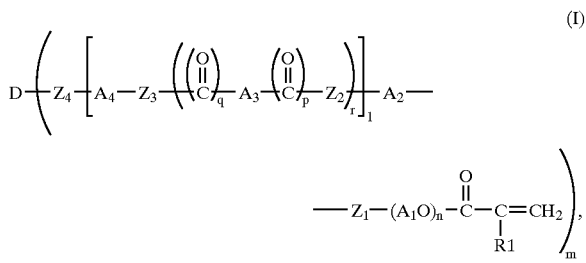

in which m represents 2, 3 or 4,

D represents the m-valent group from an aliphatic or aromatic hydrocarbon, $R_1$ is hydrogen or methyl, $Z_1$, $Z_2$ and $Z_3$, independently, represent oxygen, sulfur, the —N(R) group (in which R is hydrogen or unsubstituted or substituted alkyl, aralkyl or aryl) or a divalent group of the formula (II)

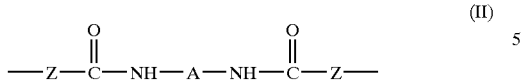

in which
Z represents oxygen, sulfur or the —N(R) group, and
A represents an unsubstituted or substituted divalent group from an aliphatic, cycloaliphatic, araliphatic or aromatic hydrocarbon,
$Z_4$ represents oxygen, the divalent group of the formula (II) or one of the following divalent groups

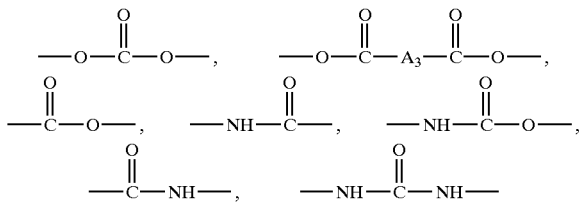

$A_1$, $A_2$, $A_3$ and $A_4$, independently, represent an unsubstituted or substituted divalent group from an aliphatic, cycloaliphatic, aromatic-aliphatic or aromatic hydrocarbon,
n is zero or an integer from 1 to 20,
p, q and r, independently, may take on the value zero or 1 and
I has a numerical value such that the weight average of the molecular weight of the compound of the formula (I) is 450 to 5000, and
B) one or more different compounds of the formula (III)

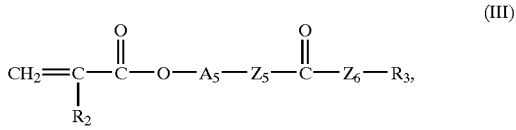

in which
$R_2$ is hydrogen or methyl,
$A_5$ represents an unsubstituted or substituted divalent group from an aliphatic or cycloaliphatic hydrocarbon,
$Z_5$ and $Z_6$, independently, represent oxygen, sulfur or the —N(R') groups, in which R' is hydrogen or unsubstituted or substituted alkyl, aralkyl or aryl, and
$R_3$ is an unsubstituted or substituted alkyl, cycloalkyl or aralkyl group,
wherein the coating contains one or more different stabilisers chosen from the group consisting of organic phosphites and organic sulfides.

2. A light guide according to claim 1, wherein $A_1$, $A_2$, $A_3$, $A_4$ and A, independently, represent an unsubstituted or substituted divalent aliphatic or cycloaliphatic hydrocarbon group.

3. A light guide according to claim 1, wherein
p and q have the value 1,
$Z_2$ and $Z_3$ represent oxygen, $Z_1$ represents oxygen or the group

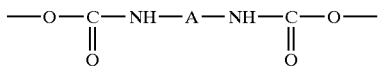

in which A is an unsubstituted or substituted divalent group from an aliphatic or cycloaliphatic $C_2$–$C_{18}$ hydrocarbon,
$Z_4$ represents oxygen or the group

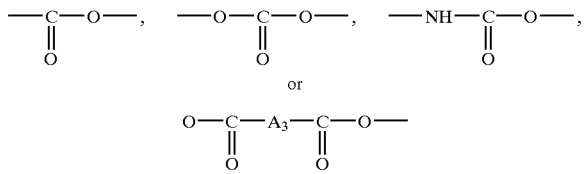

in which $A_3$ is an unsubstituted or substituted $C_2$–$C_{18}$ group from an aliphatic or cycloaliphatic hydrocarbon,
$A_1$ is an ethylene or propylene-1,2 group and
$A_2$, $A_3$ and $A_4$, independently, are unsubstituted or substituted divalent groups, preferably $C_2$–$C_8$ groups, from aliphatic or cycloaliphatic hydrocarbons.

4. A light guide according to claim 1 wherein in formula (Ill),
$A_5$ is an unsubstituted or substituted $C_2$–$C_6$ alkylene group,
$Z_5$ and $Z_6$ independently, represent oxygen or the —NH group and
$R_1$ is a $C_1$–$C_{18}$ alkyl group.

5. A light guide according to claim 1 wherein in formula (III),
$R_3$ represents an unsubstituted or substituted $C_1$–$C_5$ alkyl group,
$A_5$ represents an ethylene group and
$Z_5$ represents oxygen and $Z_6$ represent the —NH group.

6. A light guide according to claim 1 wherein the proportion of repeating units in the polymer derived from the monomers mentioned under A) in claim 1 is 25 to 75 wt. % and the proportion of repeating units in the polymer derived from the monomers mentioned under B) in claim 1 is 25 to 75 wt. % and wherein the sum of the proportions of repeating units in the polymer derived from the monomers mentioned under A) and B) in claim 1 is 50 to 100 wt. %.

7. A light guide according to claim 1 wherein the concentration of stabilisers in the coating is 0.01 wt. % to 0.5 wt. %.

8. A process for producing the light guide according to claim 1 by coating the core of the light guide with a composition containing monomers A) and B) and the stabilisers and one or more different photoinitiators, wherein the composition is polymerised on the core using UV radiation.

9. A process according to claim 8, wherein the proportion of photoinitiator in the composition is 0.1 to 10 wt. %.

10. A light guide obtainable by the process according to claim 8.

11. A means of transport containing the light guide according to claim 1.

* * * * *